United States Patent
Smyth

(10) Patent No.: US 9,224,239 B2
(45) Date of Patent: Dec. 29, 2015

(54) LOOK-BASED SELECTION FOR RENDERING A COMPUTER-GENERATED ANIMATION

(71) Applicant: DreamWorks Animation LLC, Glendale, CA (US)

(72) Inventor: Evan P. Smyth, Glendale, CA (US)

(73) Assignee: DreamWorks Animation LLC, Glendale, CA (US)

( * ) Notice: Subject to any disclaimer, the term of this patent is extended or adjusted under 35 U.S.C. 154(b) by 114 days.

(21) Appl. No.: 13/831,482

(22) Filed: Mar. 14, 2013

(65) Prior Publication Data

US 2014/0267352 A1 Sep. 18, 2014

(51) Int. Cl.
- *G06T 13/80* (2011.01)
- *G09G 5/00* (2006.01)
- *G06F 3/048* (2013.01)
- *G06T 15/50* (2011.01)
- *G06T 13/00* (2011.01)

(52) U.S. Cl.
CPC ............. *G06T 15/506* (2013.01); *G06T 13/00* (2013.01)

(58) Field of Classification Search
USPC ......... 345/418–419, 426, 581–582, 589, 440, 345/501, 619; 382/240, 254, 274, 285; 715/700, 713, 763–764
See application file for complete search history.

(56) References Cited

U.S. PATENT DOCUMENTS

| | | | |
|---|---|---|---|
| 4,922,413 A | 5/1990 | Stoughton et al. | |
| 5,329,360 A | 7/1994 | Gillard et al. | |
| 5,675,752 A | 10/1997 | Scott et al. | |
| 5,808,617 A | 9/1998 | Kenworthy et al. | |
| 5,808,625 A * | 9/1998 | Picott et al. | 345/440 |
| 5,896,139 A * | 4/1999 | Strauss | 345/440 |
| 5,982,389 A | 11/1999 | Guenter et al. | |
| 5,986,667 A | 11/1999 | Jevans | |
| 6,154,215 A | 11/2000 | Hopcroft et al. | |
| 6,243,856 B1 | 6/2001 | Meyer et al. | |

(Continued)

FOREIGN PATENT DOCUMENTS

| | | |
|---|---|---|
| EP | 1918880 A2 | 5/2008 |
| EP | 1918881 A2 | 5/2008 |

(Continued)

OTHER PUBLICATIONS

Extended European Search Report received for European Patent Application No. 14160117.9, mailed on May 26, 2014, 7 pages.

(Continued)

*Primary Examiner* — Wesner Sajous
(74) *Attorney, Agent, or Firm* — Morrison & Foerster LLP

(57) ABSTRACT

A system and method for computing a rendered image of a computer-generated object in a computer-generated scene. A dependency graph is accessed, the dependency graph including a plurality of interconnected nodes including a look-selector node. An asset is accessed at an input to the look-selector node. The asset includes a plurality of looks for the computer-generated object, each look of the plurality of looks corresponding to a different visual appearance of the computer-generated object. At the look-selector node, an active look is selected from the plurality of looks. The active look is passed to a next node of the dependency graph. The rendered image of the computer-generated object is computed having a visual appearance that corresponds to the active look.

20 Claims, 8 Drawing Sheets

(3 of 8 Drawing Sheet(s) Filed in Color)

(56) References Cited

U.S. PATENT DOCUMENTS

| | | |
|---|---|---|
| 6,252,608 B1 | 6/2001 | Snyder et al. |
| 6,263,103 B1 | 7/2001 | Freeman et al. |
| 6,496,190 B1 | 12/2002 | Driemeyer et al. |
| 6,556,200 B1 | 4/2003 | Pfister et al. |
| 6,611,262 B1 | 8/2003 | Suzuki |
| 6,760,485 B1 | 7/2004 | Gilman et al. |
| 6,919,891 B2 | 7/2005 | Schneider et al. |
| 7,174,039 B2 | 2/2007 | Koo et al. |
| 7,414,626 B1 | 8/2008 | Picott |
| 7,439,982 B2 | 10/2008 | Deniau et al. |
| 7,548,238 B2 | 6/2009 | Berteig et al. |
| 7,911,472 B2 | 3/2011 | Harper |
| 7,920,143 B1 | 4/2011 | Haratsch et al. |
| 8,009,176 B2 | 8/2011 | Zimmer |
| 8,259,110 B1 | 9/2012 | Carr et al. |
| 8,274,506 B1 | 9/2012 | Rees |
| 8,339,402 B2 | 12/2012 | Henson et al. |
| 8,352,397 B2 | 1/2013 | Rubin et al. |
| 8,352,443 B1 | 1/2013 | Polson et al. |
| 8,369,564 B2 | 2/2013 | Hervas et al. |
| 8,612,485 B2 | 12/2013 | Selan et al. |
| 8,624,898 B1* | 1/2014 | Bugaj et al. ............ 345/440 |
| 8,773,433 B1 | 7/2014 | Smyrl |
| 2002/0099684 A1 | 7/2002 | Ardoin et al. |
| 2002/0140707 A1 | 10/2002 | Samra et al. |
| 2002/0163518 A1 | 11/2002 | Rising, III et al. |
| 2003/0156117 A1 | 8/2003 | Higuchi et al. |
| 2004/0160445 A1 | 8/2004 | Whatmough |
| 2004/0189668 A1 | 9/2004 | Beda et al. |
| 2004/0222989 A1 | 11/2004 | Zhang et al. |
| 2004/0222992 A1 | 11/2004 | Calkins et al. |
| 2005/0039176 A1 | 2/2005 | Fournie et al. |
| 2005/0110790 A1 | 5/2005 | D'Amora |
| 2005/0140694 A1 | 6/2005 | Subramanian et al. |
| 2005/0256950 A1 | 11/2005 | Suzuki |
| 2005/0262470 A1 | 11/2005 | Gavrilov |
| 2007/0080964 A1 | 4/2007 | Kainz et al. |
| 2007/0176926 A1 | 8/2007 | Garcia et al. |
| 2007/0185881 A1 | 8/2007 | Vienneau et al. |
| 2008/0028414 A1 | 1/2008 | Couture-Gagnon et al. |
| 2008/0049033 A1 | 2/2008 | Yang |
| 2008/0117216 A1 | 5/2008 | Dorie |
| 2008/0231633 A1 | 9/2008 | Keller et al. |
| 2008/0238916 A1 | 10/2008 | Ghosh et al. |
| 2008/0278482 A1 | 11/2008 | Farmanbar et al. |
| 2009/0021513 A1 | 1/2009 | Joshi et al. |
| 2009/0027380 A1 | 1/2009 | Rajan et al. |
| 2010/0079462 A1* | 4/2010 | Breeds et al. ............ 345/440 |
| 2010/0123723 A1* | 5/2010 | Collard et al. ............ 345/473 |
| 2010/0134501 A1 | 6/2010 | Lowe et al. |
| 2010/0214284 A1 | 8/2010 | Rieffel et al. |
| 2010/0214313 A1 | 8/2010 | Herman et al. |
| 2010/0289804 A1 | 11/2010 | Jackman et al. |
| 2010/0302249 A1 | 12/2010 | Fowler et al. |
| 2010/0322358 A1 | 12/2010 | Drumm et al. |
| 2011/0090236 A1* | 4/2011 | Calsyn et al. ............ 345/581 |
| 2011/0106843 A1 | 5/2011 | Pan et al. |
| 2011/0181606 A1* | 7/2011 | Sumner et al. ............ 345/474 |
| 2011/0182479 A1 | 7/2011 | Sese et al. |
| 2011/0234587 A1 | 9/2011 | Maigret et al. |
| 2012/0095745 A1 | 4/2012 | Le Guevel-Scholtens et al. |
| 2012/0166446 A1 | 6/2012 | Bowman et al. |
| 2012/0280991 A1 | 11/2012 | Maloney et al. |
| 2012/0280995 A1 | 11/2012 | Anderson |
| 2012/0284664 A1 | 11/2012 | Zhao |
| 2013/0090850 A1 | 4/2013 | Mays |
| 2013/0120421 A1 | 5/2013 | Maguire |
| 2013/0120422 A1 | 5/2013 | Rao et al. |
| 2013/0127891 A1 | 5/2013 | Kim et al. |
| 2014/0035908 A1* | 2/2014 | Powell et al. ............ 345/419 |
| 2014/0059564 A1 | 2/2014 | Vigneras et al. |
| 2014/0108485 A1 | 4/2014 | Geibel et al. |

FOREIGN PATENT DOCUMENTS

| | | |
|---|---|---|
| EP | 2779100 A1 | 9/2014 |
| WO | 01/63561 A1 | 8/2001 |
| WO | 2007/146800 A2 | 12/2007 |
| WO | 2007146800 A3 | 11/2008 |
| WO | 2012/174128 A1 | 12/2012 |

OTHER PUBLICATIONS

Open Inventor Toolkit Tutorial, "Chapter 3. Nodes and Groups and Chapter 4. Cameras and Lights", Available at <http://www-evasion.imag.fr/Membres/Francois.Faure/doc/inventorMentor/sgi_html/ch03.html>, Retrieved on Oct. 18, 2013, 61 pages.

Schmalstieg et al., "Modeling and Rendering of Outdoor Scenes for Distributed Virtual Environments", ACM VRST '97 Lausanne Switzerland, 1997, pp. 209-215.

Sun Microsystems, "Reusing Scene Graphs", Java 3D API Specification, Available at <http://docs.oracle.com/cd/E17802_01/j2se/javase/technologies/desktop/java3d/forDevelopers/j3dguide/SceneGraphSharing.doc.html>, Jun. 1999, pp. 1-11.

International Search Report and Written Opinion received for PCT Patent Application No. PCT/US2014/026792, mailed on Aug. 11, 2014, 7 pages.

International Search Report & Written Opinion received for PCT Patent Application No. PCT/US2014/026799, mailed on Sep. 26, 2014, 11 pages.

"Intro to Animation", Power Point Presentation, available online at <http://visservices.sdsc.edu/courses/maya/spring06/introtoanim.ppt>, accessed on Apr. 30, 2013, 32 pages.

"Jung (Java Universal Network/Graph) Framework Manual, Filtering", available online at <http://jung.sourceforge.net/doc/manual.html#filter>, retrieved on Apr. 30, 2013, 13 pages.

"WebKit Coordinated Graphics System", available online at <http://trac.webkit.org/wiki/CoordinatedGraphicsSystem>, retrieved on Apr. 30, 2013, 9 pages.

Carstarphen, John, "Lighting Effects in Cinema 4D Animation", available online at <http://www.ehow.com/video_4444919_lighting-effects-cinema-4d-animation.html>, retrieved on Apr. 30, 2013, 2 pages.

Illinois Simulator Lab, "Syzygy Documentation: Programming and Application Frameworks", available online at <http://syzygy.isl.uiuc.edu/szg/doc/Programming.html>, retrieved on Apr. 30, 2013, Dec. 17, 2012, 11 pages.

Lu et al "Knowledge-Based Digital Media Processing: Generic Object Registration using Multiple Hypotheses Testing in Partition Trees", IEE Proc.-Vis. Image Signal Process, vol. 153, No. 3, Jun. 2006, pp. 323-330.

Oishi et al., "Parallel Alignment of a Large Number of Range Images", Proceedings of the Fourth International Conference on 3-D Digital Imaging and Modeling (3DIM'03), IEEE Computer Society, 2003, 8 pages.

Techfuels, "The Lighting Scene in 3D Animation", available online at <http://www.techfuels.com/applications/9895-lighting-scene-3d-animation.html>, retrieved on Apr. 30, 2013, 3 pages.

Toon Boom Animation, "Lighting Effects", available online at <http://beta.toonboom.com/home-users/toon-boom-studio/resources/tips-and-tricks/lighting-effects>, retrieved on Apr. 30, 2013, 2 pages.

Van Der Beek, Jelle, "Dependency Graphs in Games", Gamasutra the Art & Business of Making Games, available at <http://www.gamasutra.com/view/feature/131221/dependency_graphs_in_games.php?print=1>, accessed on Apr. 30, 2013, 15 pages.

Non Final Office Action received for U.S. Appl. No. 13/843,695, mailed on Oct. 22, 2014, 16 pages.

Non Final Office Action received for U.S. Appl. No. 13/844,424, mailed on Oct. 28, 2014, 10 pages.

Barrett et al., "A Monotonic Superclass Linearization for Dylan", Oopsla 96, Jun. 28, 1996, pp. 69-82.

Invitation to pay additional fees received for PCT Patent Application No. PCT/US2014/026799, mailed on Jul. 25, 2014, 2 pages.

Non Final Office Action received for U.S. Appl. No. 13/843,980, mailed on Feb. 5, 2015, 15 pages.

(56) References Cited

OTHER PUBLICATIONS

Non Final Office Action received for U.S. Appl. No. 13/844,016, mailed on Feb. 5, 2015, 23 pages.
Non-Final Office Action received for U.S. Appl. No. 13/844,363, mailed on Feb. 24, 2015, 9 pages.
Non-Final Office Action received for U.S. Appl. No. 13/831,309, mailed on Feb. 24, 2015, 8 pages.
Final Office Action received for U.S. Appl. No. 13/843,695, mailed on Feb. 23, 2015, 21 pages.
Non-Final Office Action received for U.S. Appl. No. 13/844,497, mailed on Mar. 13, 2015, 21 pages.
Rossler et al., "Dynamic Shader Generation for Flexible Multi-Volume Visualization", Visualisation Symposium, Mar. 2008, pp. 17-24.
Non Final Office Action received for U.S. Appl. No. 13/844,113, mailed on Apr. 10, 2015, 10 pages.
Final Office Action received for U.S. Appl. No. 13/831,309, mailed on Jun. 5, 2015, 8 pages.
Notice of Allowance received for U.S. Appl. No. 13/831,309, mailed on Jul. 21, 2015, 14 pages.
Final Office Action received for U.S. Appl. No. 13/844,363, mailed on Aug. 6, 2015, 12 pages.
Notice of Allowance received for U.S. Appl. No. 13/844,380, mailed on Jul. 17, 2015, 7 pages.
Extended European Search Report (includes Supplementary European Search Report and Search Opinion) received for European Patent Application No. 14160119.5, mailed on Jun. 30, 2015, 11 pages.
"Robocopy.exe Robust File Copy Utility Version XP010", Microsoft Corporation, 2003, pp. 1-35.
"Open Inventor toolkit Tutorial", Chapter 3. Nodes and Groups and Chapter 4. Cameras and Lights, Available online at <http://www-evasion.imag.fr/Membres/Francois.Faure/doc/inventorMentor/sgi_html/ch03.html>, Retrieved on Oct. 18, 2013, 61 pages.
Bederson et al., "Toolkit Design for Interactive Structured Graphics", IEEE Transactions On Software Engineering, vol. 30, No. 8, Aug. 2004, pp. 535-546.
Qi-Cheng et al., "High-Extensible Scene Graph Framework Based on Component Techniques", Journal of Zhejiang University Science A, vol. 7, No. 7, 2006, pp. 1247-1252.
Dobos et al., "3D Revision Control Framework", Web3D, 2012, pp. 121-129.
Dollner et al., "Object-Oriented 3D Modelling, Animation and Interaction", The Journal of Visualization and Computer Animation, vol. 8, 1997, pp. 33-64.
Tobler, Robert F., "Separating Semantics from Rendering: A Scene Graph Based Architecture for Graphics Applications", Visual Computer, vol. 27, 2011, pp. 687-695.

\* cited by examiner

LOOK-BASED SELECTION FOR RENDERING A COMPUTER-GENERATED ANIMATION

BACKGROUND

1. Field

The present disclosure relates to computer-generated animation and, more specifically, to rendering an image of a computer-generated scene using a dependency graph.

2. Related Art

A computer-generated animation image can be created by rendering one or more computer-generated objects to depict a scene in the image. Light sources, materials, textures, and other visual effects can be associated with the computer-generated objects to create a realistic visual appearance for the animation image. A dependency graph can be used to define the relationships between assets (which represent the computer-generated objects) and a variety of visual effects as part of the rendering process. The dependency graph typically includes one or more interconnected nodes associating the assets with one or more visual effects, where a node wire can pass the assets and visual effects from node-to-node for processing. The output of the dependency graph can be used to create a rendered image of the scene.

In a typical computer-animation scenario, a computer-generated object is an animated character or object that can be posed or placed in the scene. Multiple visual effects are applied to the character or object to define a lighting configuration for the scene, which gives the character or object a more realistic appearance. In some cases, there are different visual representations that are used depict the character or object. For example, an animated character may change clothing, hair styles, or other visual appearances as dictated by the animator or director. Traditionally, the different visual appearances are treated as separate computer-generated objects and, therefore, the visual effects must be reapplied for every change. This results in redundant lighting setups and may increase the difficulty in maintaining consistent lighting conditions for multiple visual appearances of the animated character.

It is therefore desirable to create a system that applies the same visual effects or lighting conditions to a different visual appearance of the same animated character without the drawbacks mentioned above.

SUMMARY

One exemplary embodiment includes a computer-implemented method for computing a rendered image of a computer-generated object in a computer-generated scene. A dependency graph is accessed. The dependency graph comprises a plurality of interconnected nodes, wherein one of the interconnected nodes includes a look-selector node. An asset is accessed at an input of the look-selector node. The asset includes a plurality of looks for the computer-generated object, each look of the plurality of looks corresponding to a different visual appearance of the computer-generated object. An active look is selected from the plurality of looks, at the look-selector node. The active look is passed to a next node of the dependency graph. The rendered image of the computer-generated object is computed, the computer-generated object having a visual appearance that corresponds to the active look.

In some embodiments, the selected look includes unique surface geometry that is not included in the other looks of the plurality of looks. In some cases, the selected look includes unique surface shading detail that is not included in the other looks of the plurality of looks.

In some embodiments, one or more nodes of the plurality of nodes assigns a visual effect to the asset. In some cases, the visual effect is a virtual light source. In some embodiments, a visual effect is assigned to the asset at an upstream node that precedes the look-selector node in the dependency graph, wherein the visual effect is assigned to each look of the plurality of looks of the asset. In some embodiments, a visual effect is assigned to the asset at a downstream node that follows the look-selector node in the dependency graph, wherein the visual effect is assigned only to the active look of the plurality of looks of the asset.

In some embodiments, the next node is a render node and the render node is used to compute the rendered image of the computer-generated scene. In some embodiments, the dependency graph includes two or more look-selector nodes, each look-selector node passing a different active look to a respective render node that is downstream from the look-selector node in the dependency graph.

BRIEF DESCRIPTION OF THE FIGURES

The patent or application file contains at least one drawing executed in color. Copies of this patent or patent application publication with color drawing(s) will be provided by the Office upon request and payment of the necessary fee.

The present application can be best understood by reference to the following description taken in conjunction with the accompanying drawing figures, in which like parts may be referred to by like numerals.

DETAILED DESCRIPTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the present technology. Thus, the disclosed technology is not intended to be limited to the examples described herein and shown, but is to be accorded the scope consistent with the claims.

A computer-generated animation is typically created by rendering a sequence of images, each image depicting a computer-generated scene composed of one or more computer-generated objects. Light sources, materials, textures, and other visual effects are associated with the computer-generated objects to create a realistic visual appearance for the computer-generated scene.

Figure 1:
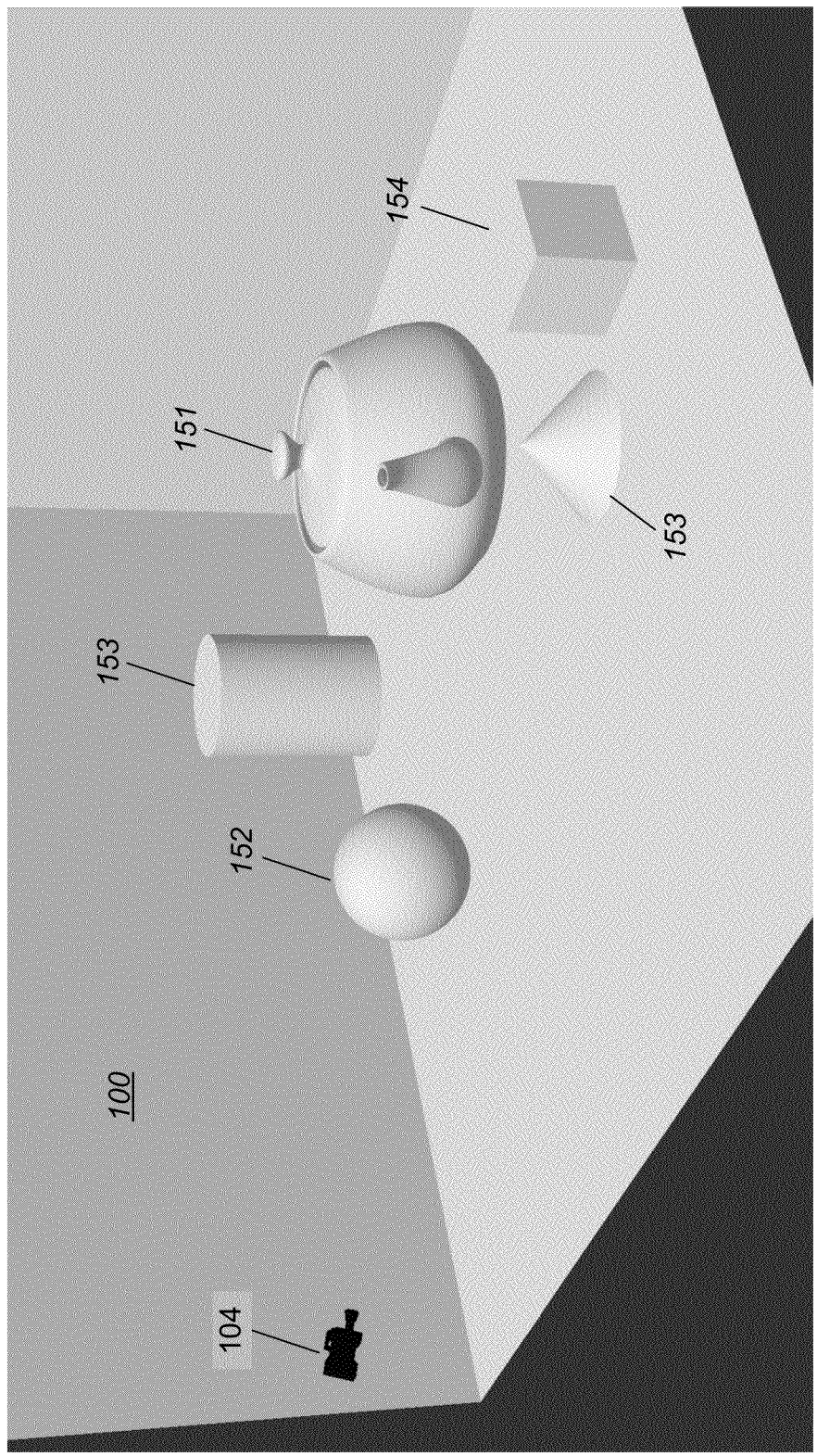
FIG. 1 depicts a set of computer-generated objects associated with a scene.

FIG. 1 depicts an exemplary computer-generated scene having multiple computer-generated objects positioned in a three-dimensional space. For purposes of this discussion, a computer-generated scene generally refers to the three-dimensional space that can be filmed using a virtual camera, and may also be referred to generically as a scene. As shown in FIG. 1, the scene 100 includes surface models of a teapot 151, a sphere 152, a cylinder 153, a cone 153, and a cube 154. In a typical computer animation, the computer-generated objects include one or more computer-animated characters that have been posed or manipulated for purposes of generating a computer-animated film sequence. In this example, the computer-generated objects are surface models defined using surface geometry. In other examples, the computer-generated objects may be defined using solid geometry or defined using other three-dimensional modeling techniques.

As shown in FIG. 1, a virtual camera 104 is positioned to view a portion of the scene 100. Typically, the virtual camera 104 has a field of view that is defined by a camera frustum that projects away from the lens of the virtual camera 104. The position of the virtual camera 104 and computer-generated objects (151-154) in the scene 100 are typically determined by a human operator, such as an animator or director.

Figure 2:
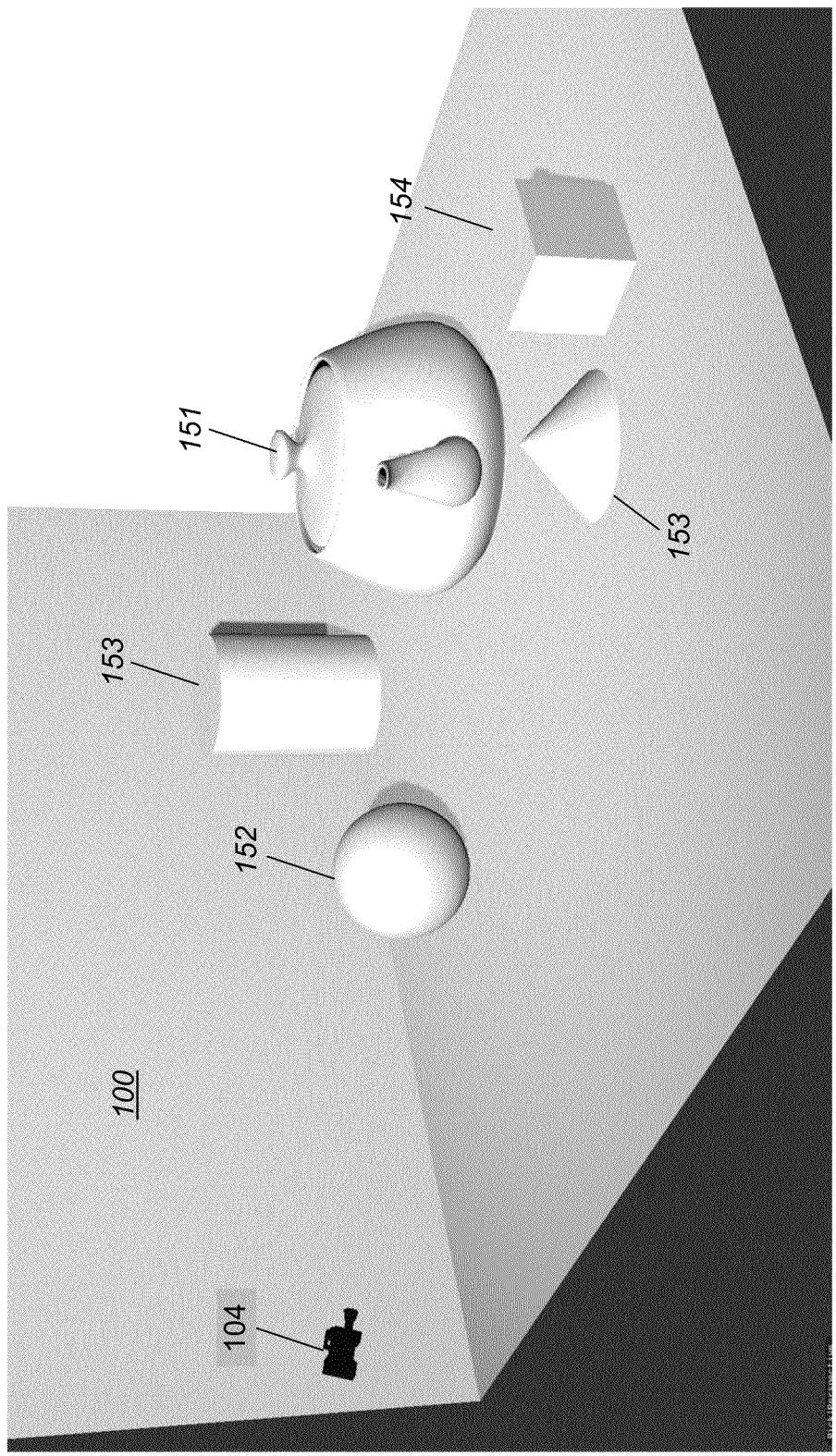
FIG. 2 depicts a set of computer-generated objects associated with a scene with lighting effects applied.

As described in more detail below, lights and other visual effects may also be applied to the scene 100 to give it a more realistic appearance. FIG. 2 depicts the scene 100 with lighting effects applied to the computer-generated objects 151-154. As shown in FIG. 2, the computer-generated objects have been illuminated by a diffuse light source so that the computer-generated objects 151-154 are illuminated from the camera-side. Each computer-generated object 151-154 is shaded in accordance with the diffuse light source and cast a shadow on the floor and walls of the scene 100. The scene 100 is also illuminated by one or more ambient light sources to provide an overall illumination lighting effect to the scene 100. Other light sources that can be used to illuminate the scene 100 include, for example, point lights, spot lights, and area lights.

Figure 3:
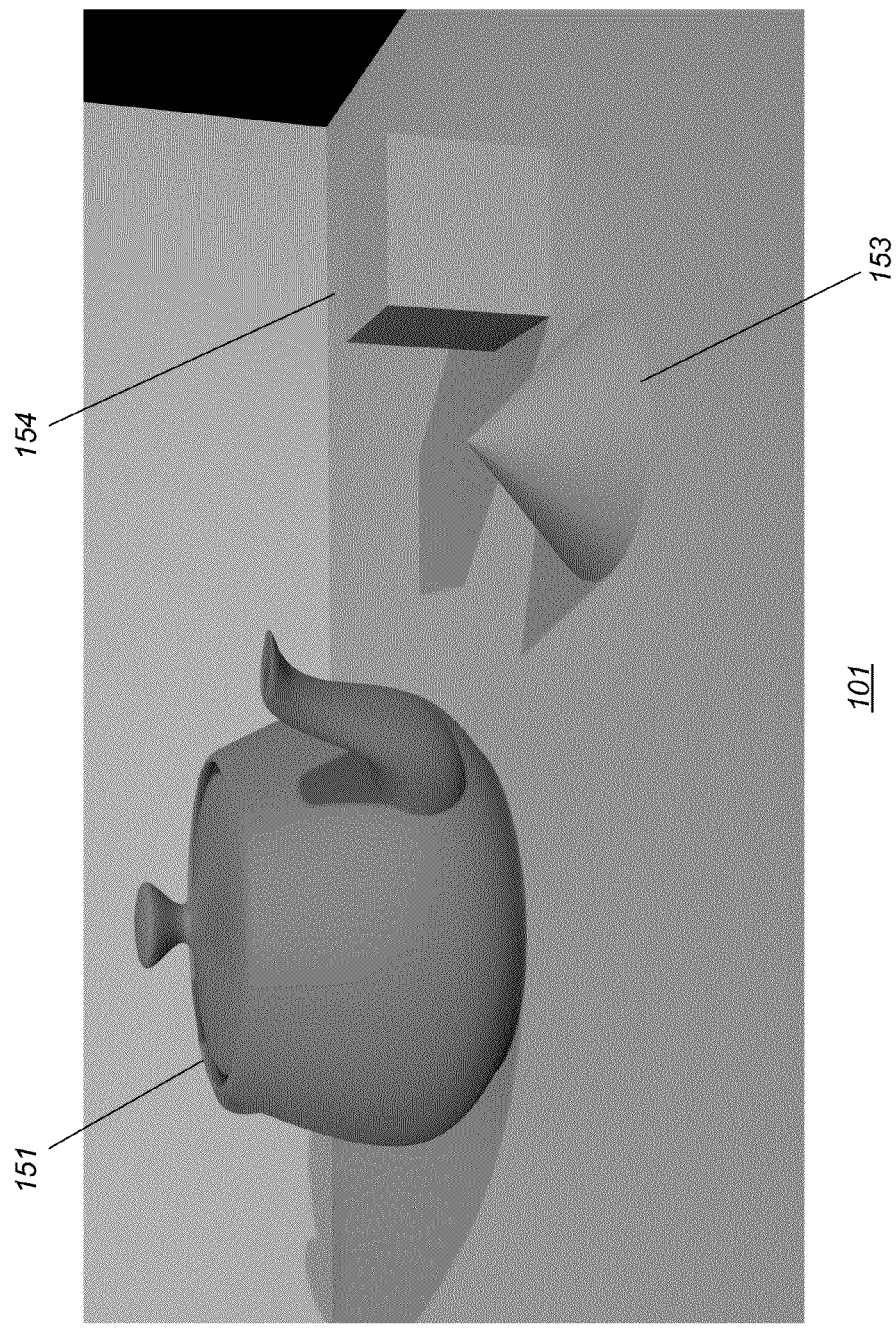
FIG. 3 depicts a rendered image of a scene.

FIG. 3 depicts a rendered image 101 of the portion of the scene 100 in view of the virtual camera 104. The computer-generated objects 151, 153, and 154 in FIG. 3 have been rendered using multiple light sources and one or more types of surface shaders for each computer-generated object to produce a realistic-looking image of the scene 100. Surface shaders are used to simulate the optical properties of the surface of the computer-generated objects and define the color, texture, specular properties, and other optical characteristics of the surface of the computer-generated objects. A surface shader may use, for example, a bidirectional reflectance distribution function (BRDF) or other technique for simulating the reflection of light incident on a computer-generated surface. The surface shaders may also be used to define a group of optical properties to simulate a material (e.g., fur, skin, or metal). Typically, the configuration of the light sources, surface shaders, and surface materials are configurable for each computer-generated scene and may be referred to generally as a lighting configuration.

Figure 4A:
FIG. 4A depicts a computer-generated object rendered using a first look.
Figure 4B:
FIG. 4B depicts a computer-generated object rendered using a second look.

As mentioned previously, an animated character may change visual appearance as determined by the animator or director. FIGS. 4A-B depict two different visual appearances or "looks" for the same animated character, Alex the lion. In FIG. 4A depicts a first look of Alex the lion with a brown-colored mane. FIG. 4B depicts a second look for Alex the lion with a purple-colored mane. There may be additional, different looks for Alex the lion that include different clothing, hair styles, levels of detail, or beauty. For example, a low-resolution "level-of-detail" look for Alex may be used for scenes where Alex is far from the camera and fine features, such as fur or whiskers are too small to see. There may be multiple level-of-detail looks, each look representing the appearance of a character as viewed from a different distance. Additionally, an animated character may have a "beauty" look that defines a full-detail version of the animated character. A beauty look may be appropriate when creating a cinema-quality rendered image of the animated character. In many cases, the different looks are created using different surface geometry, surface shaders, and/or materials.

As previously mentioned, a lighting configuration may be designated on an object-by-object basis or by set of objects in a scene. For example, a spot-light light source may be associated only with the main characters in the foreground of the scene and may not illuminate other objects. Alternatively, an ambient light might be associated with only the plants in the scene and have no effect on the main characters. This approach simplifies the computations required to render a scene and also provides the animator or user with more flexibility when configuring the visual effects in a scene. However, the additional flexibility can make it difficult to manage a large number of computer-generated objects and their associated visual effects. Managing a large number of associations may become even more difficult when the same computer-generated objects (e.g., animated characters) have multiple looks, each look having an association with various visual effects.

Figure 5:
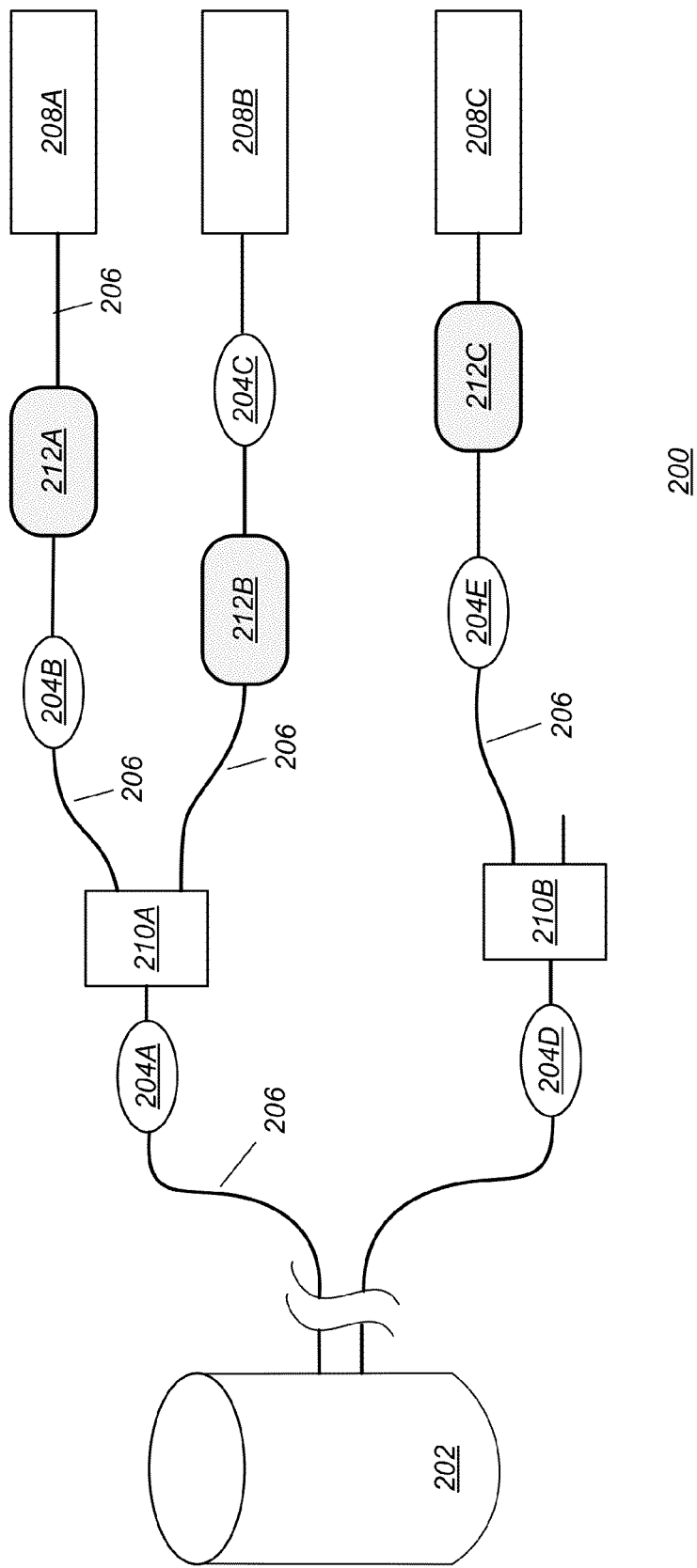
FIG. 5 depicts a schematic representation of a render setup graph.

In the implementations described herein, a dependency graph is used to manage the associations between computer-generated objects and visual effects. For purposes of this discussion, a particular type of dependency graph, called a render setup graph, is used to manage the associations between computer-generated objects and visual effects used to render the scene. FIG. 5 depicts an exemplary visualization of a render setup graph 200. The render setup graph 200 may be displayed on a computer display and manipulated using a graphical user interface and computer I/O hardware, as described in more detail in Section 2, below. The render setup graph 200 is generally configurable by an animator or user and can be used to create multiple lighting scenarios for a scene.

The render setup graph 200 typically accepts as input, a set of computer-generated objects represented by assets located in asset storage 202. In this implementation, one or more of the assets corresponds to an animated character or computer-generated object having multiple looks, or visual representations. As discussed above, each look may have different geometry, clothing, materials, or level of detail. In this implementation, the multiple looks for an animated character or computer-generated object are included in a single asset in the render setup graph.

In the render setup graph 200, visual effects, such as light sources, shaders, and materials are assigned to the assets at various nodes 204A-E. In this example, the render setup graph 200 is evaluated from left to right with each node 204A-E assigning one or more visual effects to a set of assets, each asset representing a computer-generated object in the scene. Node wires 206 are used to pass assets and associated visual effects between elements of the render setup graph 200. Assets and their associated visual effects can also be routed by organizer nodes 210A-B configured to divide an input set of assets into two or more subsets. Eventually, the assets and their associated visual effects are passed to one of the render nodes 208A-C. In this example, each render node 208A-C contains the completed lighting configuration and can be stored or used to create a rendered image of the scene.

Render setup graph 200 also includes a special type of node called a look-selector node 212A-C. As described above, an asset may have multiple looks corresponding to different visual appearances of an animated character. As an asset progresses through the render setup graph, only one look can be active at a time. The look-selector node 212A-C selects one of the multiple looks to be passed on as the active look to subsequent nodes in the render setup graph.

Render setup graphs typically include other elements that provide a variety of functions and operations on the assets as they propagate through the elements. For example, a render setup graph may also include splitter, combiner, and other routing elements. These other elements are omitted from this discussion and the example depicted in FIG. 5 for clarity. The techniques discussed below also apply to render setup graphs having additional elements or fewer elements to those depicted in the render setup graph 200 of FIG. 5.

In general, a render setup graph can be used to define multiple rendering passes for a scene. Each rendering pass may combine a subset of partition assets with a unique grouping of visual effects. For example, a rendering pass may be configured to render only the assets in the background of the scene. A rendering pass may also be configured to render a subset of partition assets using a simplified set of light sources and shaders to reduce the rendering computations that are necessary to compute the rendered image of the scene.

The render setup graph 200 depicted in FIG. 5 depicts three exemplary rendering passes, as indicated by the presence of three render nodes 208A-C. The lighting configurations for each rendering pass are defined by the respective nodes 204A-E that are connected to each respective render node 208A-C by the node wires 206.

In some cases, it may be desirable to render the scene using the same lighting configuration, but with different looks for the computer-generated objects. For example, the same lighting configuration may be used for both a first, standard look of an animated character for pre-production rendering purposes and for a second, beauty look of a character for cinema-quality rendering purposes. Without a look-selector node, the entire portion of the render setup graph associated with a particular render pass would have to be duplicated in order to create the two rendered images: one portion of the graph for the standard look, and a second portion of the graph for the beauty look.

However, using a look-selector node, portions of the render setup graph do not need to be re-setup or duplicated in order to produce a rendered image with different looks for a computer-generated object or animated character. As described in more detail below with respect to process 1000, a look-selector node can be used to change the active look of a computer-generated object to generate a rendered image of the scene with animated characters having a different visual appearance. As shown in FIG. 5, if the look-selector nodes 212A-C are placed near their respective render nodes 208A-C, the visual effects assigned by the upstream nodes (204A-B, 204D-E) can be re-used for different looks designated by the downstream look-selector nodes 212A-C. As a result, the use of look-selector nodes 212A-C may result in a simplified render setup graph that is easier to manage and maintain.

1. Evaluating a Dependency Graph Using Look-Selector Nodes

Figure 6:
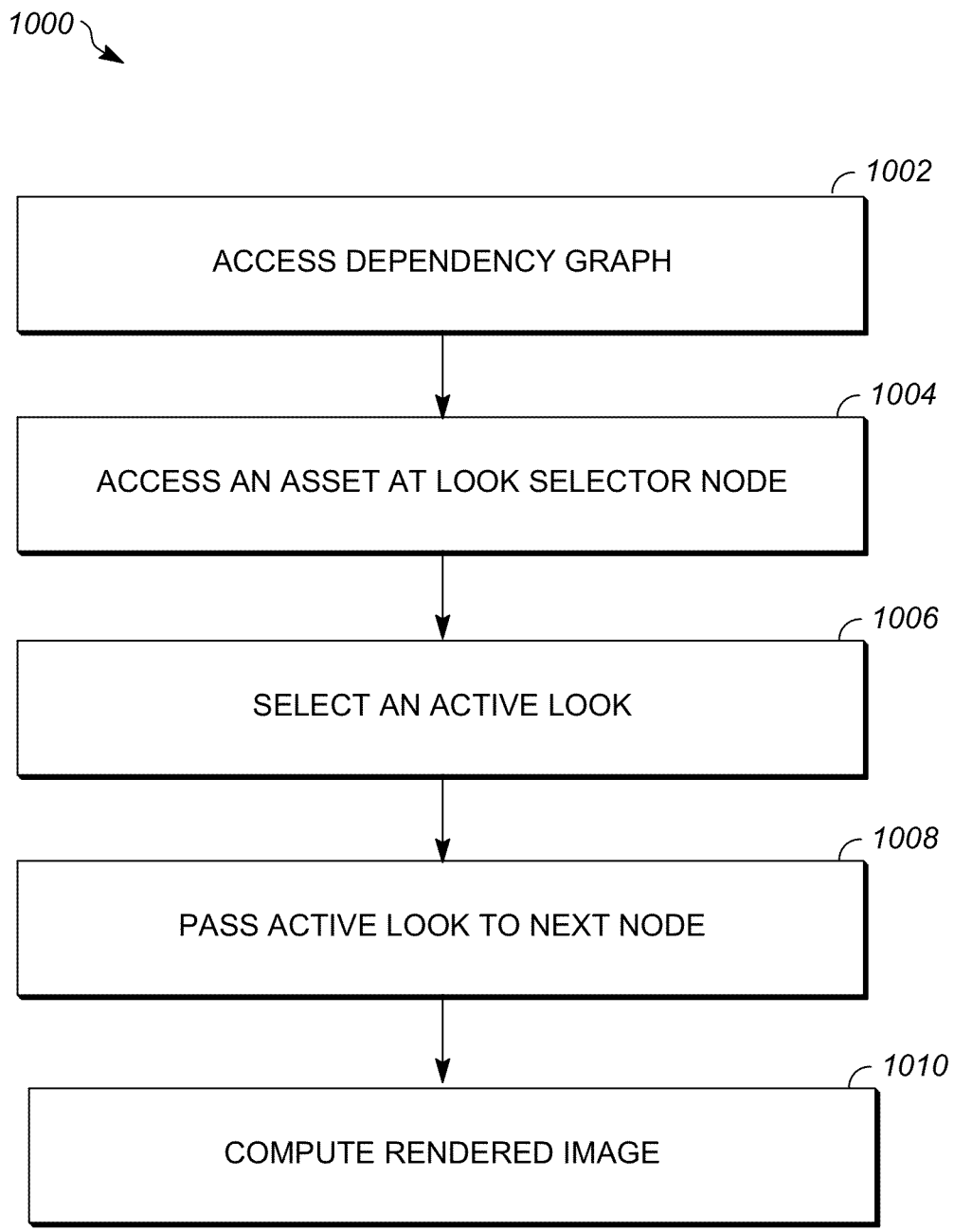
FIG. 6 depicts an exemplary process for rendering an image using look-based partitioning in a dependency graph.

FIG. 6 depicts an exemplary process 1000 for evaluating a dependency graph, such as a render setup graph. Process 1000 may be performed using a workstation computer system, as described below with respect to FIG. 7 as part of a computer-animation process. Exemplary process 1000 may be performed, for example, after the computer-generated objects (e.g., animated characters) have been placed or posed in the scene and stored as assets in a centralized storage database. Process 1000 is typically performed before an image of the scene has been rendered.

Process 1000 may provide advantages over other rendering techniques that do not use a look-selector node. Specifically, process 1000 may reduce the complexity and redundancy in a render setup graph by reusing a lighting configuration for objects having different looks. Using process 1000, the director or animator may establish the lighting configuration for a rendering pass of a scene once, and reuse the configuration to render animated characters having different visual appearances.

Process 1000 is typically practiced while computing a rendering pass of a computer-generated scene for an animated film sequence using a dependency graph. For purposes of the following discussion, examples of process 1000 are provided with respect to a look-selector node of a render setup graph. Reference is made to FIG. 5 depicting a render setup graph 200 including look selector nodes 212A, 212B, and 212C. In other implementations, the look-selector nodes or the functions performed by the look-selector nodes could be combined with other nodes of the render setup graph.

In operation 1002, a dependency graph is accessed. FIG. 5 depicts one type of dependency graph, namely a render setup graph 200. As discussed above, the render setup graph 200 includes a plurality of nodes 204A-E, 210A-B, 212A-C and 208A-C that are interconnected using node wires 206. The nodes 204A-E may associate one or more visual effects (e.g., lighting or materials) with a set of assets representing computer-generated objects in the scene. The assets and associated visual effects are passed between the interconnected nodes via the node wires 206.

As described above with respect to FIG. 5, look-selector nodes 212A-C are used to select or designate an active look that can be passed to downstream elements of the render setup graph. Using one or more look-selector nodes, a render setup graph can be configured to render an animated character having multiple looks using a single rendering pass represented by one of the render node 208A-C.

In operation 1004, an asset is accessed at a look-selector node. With reference to the render setup graph in FIG. 5, an asset is accessed at an input of one of the look-selector nodes 212A-C. In this example, the asset is accessed as a set of assets at an input of one of the look-selector nodes 212A-C via one or more node wires 206. The asset represents a computer-generated object, such as an animated character. In this example, the asset includes multiple looks for the computer-generated object, each look corresponding to a different visual appearance of the computer-generated object when rendered in an image. With reference to the animated character Alex the lion depicted in FIG. 4A-B, the asset that represents Alex the lion includes at least two different looks: a first look with a brown-colored mane and a second look with a purple-colored mane.

The other assets in the set of assets typically represent other computer-generated objects in the scene. These other assets may also include multiple looks for each of the other computer-generated objects. In many cases, multiple assets in the set have at least two looks: a first, standard look used for pre-production rendering purposes and a second, beauty look used for cinema-quality rendering purposes.

As shown in FIG. 5, the look-selector nodes 212A-C are downstream of at least one or more nodes (204A-B, 204D-E) used to assign visual effect to the assets that are passed through the render setup graph. In this example, the visual effects are associated with each of the looks of an asset as it is passed through a respective node 204A-E of the dependency graph. In this way, the same lighting configuration can be applied to different looks of an asset at the same time. With regard to operation 1004, the visual effects that have been associated with the assets as they are passed through the render setup graph are also typically received at the look-selector node 212A-C.

In operation 1006, an active look is selected at the look-selector node. The active look corresponds to a visual appearance of the computer-generated object that is to be included in the rendered image. For example, in the scenario if a pre-production rendering pass is being performed, the look-selector node may be configured to select a standard look of the asset as the active look. Alternatively, if a cinema-quality rendering pass is being performed, the look selector node may be configured to select a beauty look of the asset as the active look.

In many cases, the look-selector node also selects an active look for the other assets of the set of assets that are received at the look-selector node. The active look that is selected for the other assets may correspond to each other. For example, in the case where a cinema-quality rendering pass is being performed, the look selector node may be configured to select a beauty look as the active look for each of the assets having a beauty look.

It is not necessary that the active look for of all the assets be set to the same active look. For example, the beauty look may be selected for one of the assets, which is being inspected for detail flaws in the rendering pass. A low resolution level-of-detail may be selected for the other assets to reduce the processing load when computing the rendered image (in operation 1010, below). With reference to Alex the lion depicted in FIG. 4B, the first look corresponding the Alex with a purple-colored mane may be selected only for the asset that represents Alex the lion. The other assets may not have a look that corresponds to a different colored mane and may not be affected by the look-selector node.

The look-selector node may be configurable to select a different look based on a user input. Additionally or alternatively, the look-selector node may be configurable to select a different look depending on a value or setting that is stored in computer memory. In another embodiment, the type of look that is selected by the look-selector is not configurable. In this case, different look-selector nodes must be swapped into the render setup graph in order the change the type of look that is selected.

In operation 1008, the active look of the asset is passed to the next node in the render setup graph. With reference to FIG. 5, the active look selected by, for example, look-selector node 212A passed to the next downstream node 208A via node wire 206. Visual effects that have already been associated with the set of partition assets by, for example, upstream nodes 204A and 204B, are also passed to the next node in the render setup graph.

In some cases, downstream nodes may assign additional visual effects to the set of assets that are passed from the look-selector node. For example, as shown in FIG. 5, assets passed from look-selector node 212B are passed to node 204C, which may assign additional visual effects to the assets. In contrast to node 204A that is upstream of the look-selector nodes 212B, the downstream node 204C only assigns visual effects to the active look of the assets. As discussed above, the nodes that are upstream of a look-selector node typically assign visual effects to all of the looks of an asset.

In operation 1010, a rendered image is computed. As shown in FIG. 5, the assets and associated visual effects are eventually passed to a respective render node 208A-C. Each render node 208A-C corresponds to a different rendering pass and can each be used to produce a rendered image. In this example, the information received at one of the render nodes 208A-C can then be passed to a rendering process to compute a rendered image. Computing a rendered image may include performing one or more processes on the assets using the selected visual effect(s) based on the dependency graph. The external processes may include any process, such as rendering, shading, rasterizing, or the like that the animator, lighter, or other user may want to perform on the objects used by the dependency graph.

FIGS. 4A-B depict two exemplary images that may be produced using process 1000. FIG. 4A depicts an exemplary rendered image depicting Alex the lion using a first look. As shown in FIG. 4A, the first look for Alex corresponds to a visual appearance including a brown-colored mane. FIG. 4B depicts another exemplary image depicting Alex the lion using a second look. As shown in FIG. 4B, the second look for Alex corresponds to a visual appearance including a purple-colored mane.

In other examples, a rendered image can be created using an active look that is different than the two depicted in FIGS. 4A and 4B. For example a low-resolution level-of-detail look or beauty look could also be used to compute a rendered image. As mentioned above, other looks may depict different clothing, hair styles, or other visual appearances for the animated character.

In a typical implementation, multiple rendered images are created having the animated character in different positions. Process 1000 may be repeated to create each rendered image. The rendered images may be used to create an animated film sequence of the scene including the animated characters and other computer-generated objects represented by the assets in the render setup graph.

2. Workstation Computer System

Figure 7:
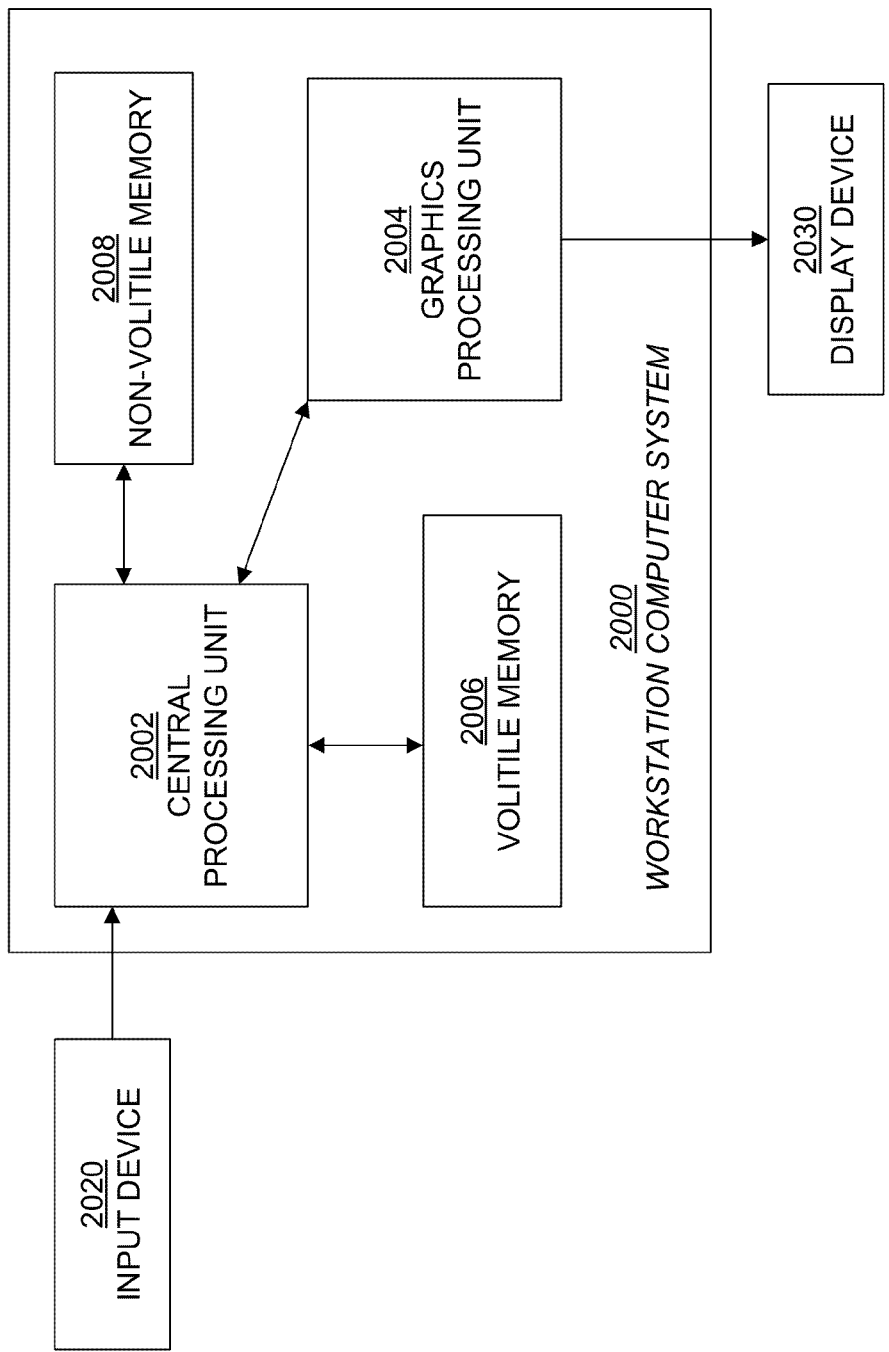
FIG. 7 depicts an exemplary workstation computer system.

FIG. 7 depicts an exemplary workstation computer system 2000 that can be used to implement the render setup graph and techniques discussed above. The render setup graph can be implemented, for example, in either hardware or in software stored on a non-transitory computer-readable storage medium. The system can be configured to generate, modify, and evaluate the render setup graph to configure and manage lighting configuration data as well as external processes used to render a computer-generated image. The system can be further configured to receive input from a user and to display graphics, an image, or scene of an animation based on the render setup graph.

The workstation computer system 2000 can be configured to receive user input from an input device 2020. The input device 2020 can be any device that receives input from the user and transmits it to the workstation computer system 2000. For example, the input device 2020 can be a keyboard, a mouse, a tablet, a stylus, or the like. Those skilled in the art will recognize that other types of input devices can also be used.

The workstation computer system 2000 can be configured to output graphics, images, or animation to a display device 2030. The display device 2030 can include any device that receives data from the workstation computer system and presents the data to the user. For example, the display device 2030 may include a liquid crystal display, a set of light-emitting diodes, a projector, or the like. Those skilled in the art will recognize that other types of output devices can also be used.

The workstation computer system 2000 may further include a central processing unit 2002. The central processing unit may include one or more processing cores. The central processing unit 2002 may be coupled to and able to communicate with the input device 2020. Although the workstation computer system 2000 is illustrated with one central processing unit 2002, the workstation computer system 2000 may include multiple processing units. The workstation computer system 2000 may also include a graphics processing unit 2004. The graphics processing unit 2004 may be dedicated to processing graphics-related data. The graphics processing unit 2004 may include a single processing core or multiple processing cores. Although the workstation computer system 2000 is illustrated with one graphics processing unit 2004, the workstation computer system 2000 may include a plurality of graphics processing units. The central processing unit 2002 and/or the graphics processing unit 2004 may be coupled to and able to communicate data to the output device 2030.

In one example, the workstation computer system 2000 may include one or more processors and instructions stored in a non-transitory computer-readable storage medium, such as a memory or storage device, that when executed by the one or more processors, perform animation rendering using a render setup graph, as described above. In the context of the embodiments described herein, a "non-transitory computer-readable storage medium" can be any medium that can contain or store the program for use by or in connection with the instruction execution system, apparatus, or device. The non-transitory computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The workstation computer system 2000 may include volatile memory 2006, which is a non-transitory computer-readable storage medium, in communication with the central processing unit 2002. The volatile memory 2006 may include, for example, random access memory, such as dynamic random access memory or static random access memory, or any other type of volatile memory. The volatile memory 2006 may be used to store data or instructions during the operation of the workstation computer system 2000. Those skilled in the art will recognize that other types of volatile memory can also be used.

The workstation computer system 2000 may also include non-volatile memory 2008, which is a non-transitory computer-readable storage medium, in communication with the central processing unit 2002. The non-volatile memory 2008 may include flash memory, hard disks, magnetic storage devices, read-only memory, or the like. The non-volatile memory 2008 may be used to store animation data, render setup graph data, computer instructions, or any other information. Those skilled in the art will recognize that other types of non-volatile memory can also be used.

The workstation computer system 2000 is not limited to the devices, configurations, and functionalities described above. For example, although a single volatile memory 2006, non-volatile memory 2008, central processing unit 2002, graphics processing unit 2004, input device 2020, and output device 2030 are illustrated, a plurality of any of these devices can be implemented internal or external to the workstation computer system 2000. In addition, the workstation computer system 2000 may include a network access device for accessing information on a network, such as an internal network or the Internet. Those skilled in the art will recognize that other configurations of the workstation computer system 2000 can be used.

Various exemplary embodiments are described herein. Reference is made to these examples in a non-limiting sense. They are provided to illustrate more broadly applicable aspects of the disclosed technology. Various changes may be made and equivalents may be substituted without departing from the true spirit and scope of the various embodiments. In addition, many modifications may be made to adapt a particular situation, material, composition of matter, process, process act(s), or step(s) to the objective(s), spirit, or scope of the various embodiments. Further, as will be appreciated by those with skill in the art, each of the individual variations described and illustrated herein has discrete components and features that may be readily separated from or combined with the features of any of the other several embodiments without departing from the scope or spirit of the various embodiments.

What is claimed is:

1. A computer-implemented method, performed using one or more processors, for computing a rendered image of a computer-generated object in a computer-generated scene, the method comprising:
    accessing, using the one or more processors, a dependency graph, the dependency graph comprising a plurality of interconnected nodes, wherein one of the interconnected nodes includes a look-selector node;
    accessing, using the one or more processors, an asset at an input of the look-selector node, wherein the asset includes a plurality of looks for the computer-generated object, each look of the plurality of looks corresponding to a different visual appearance of the computer-generated object;
    selecting, using the one or more processors, at the look-selector node, an active look from the plurality of looks;
    passing, using the one or more processors, the active look to a next node of the dependency graph; and
    computing, using the one or more processors, the rendered image of the computer-generated object having a visual appearance that corresponds to the active look.

2. The computer-implemented method of claim 1, wherein the selected look includes unique surface geometry that is not included in the other looks of the plurality of looks.

3. The computer-implemented method of claim 1, wherein the selected look includes unique surface shading detail that is not included in the other looks of the plurality of looks.

4. The computer-implemented method of claim 1, wherein one or more nodes of the plurality of nodes assigns a visual effect to the asset.

5. The computer-implemented method of claim 1, wherein the visual effect is a virtual light source.

6. The computer-implemented method of claim 1, further comprising:
    assigning a visual effect to the asset at an upstream node that precedes the look-selector node in the dependency graph, wherein the visual effect is assigned to each look of the plurality of looks of the asset.

7. The computer-implemented method of claim 1, further comprising:
    assigning a visual effect to the asset at a downstream node that follows the look-selector node in the dependency graph, wherein the visual effect is assigned only to the active look of the plurality of looks of the asset.

8. The computer-implemented method of claim 1, wherein the next node is a render node and the render node is used to compute the rendered image of the computer-generated scene.

9. The computer-implemented method of claim 1, wherein the dependency graph includes two or more look-selector nodes, each look-selector node passing a different active look to a respective render node that is downstream from the look-selector node in the dependency graph.

10. A tangible, non-transitory computer-readable storage medium comprising computer-executable instructions for computing a rendered image of a computer-generated object in a computer-generated scene, the computer-executable instructions comprising instructions for:
   accessing a dependency graph, the dependency graph comprising a plurality of interconnected nodes, wherein one of the interconnected nodes includes a look-selector node;
   accessing an asset at an input of the look-selector node, wherein the asset includes a plurality of looks for the computer-generated object, each look of the plurality of looks corresponding to a different visual appearance of the computer-generated object;
   selecting, at the look-selector node, an active look from the plurality of looks;
   passing the active look to a next node of the dependency graph; and
   computing the rendered image of the computer-generated object having a visual appearance that corresponds to the active look.

11. The computer-readable storage medium of claim 10, wherein the selected look includes unique surface geometry that is not included in the other looks of the plurality of looks.

12. The computer-readable storage medium of claim 10, wherein the selected look includes unique surface shading detail that is not included in the other looks of the plurality of looks.

13. The computer-readable storage medium of claim 10, further comprising:
   assigning a visual effect to the asset at an upstream node that precedes the look-selector node in the dependency graph, wherein the visual effect is assigned to each look of the plurality of looks of the asset.

14. The computer-readable storage medium of claim 10, further comprising:
   assigning a visual effect to the asset at a downstream node that follows the look-selector node in the dependency graph, wherein the visual effect is assigned only to the active look of the plurality of looks of the asset.

15. The computer-readable storage medium of claim 10, wherein the next node is a render node and the render node is used to compute the rendered image of the computer-generated scene.

16. The computer-readable storage medium of claim 10 wherein the dependency graph includes two or more look-selector nodes, each look-selector node passing a different active look to a respective render node that is downstream from the look-selector node in the dependency graph.

17. An apparatus for computing a rendered image of a computer-generated object in a computer-generated scene, the apparatus comprising:
   a memory configured to store data; and
   a computer processor configured to:
      access a dependency graph, the dependency graph comprising a plurality of interconnected nodes, wherein one of the interconnected nodes includes a look-selector node;
      access an asset at an input of the look-selector node, wherein the asset includes a plurality of looks for the computer-generated object, each look of the plurality of looks corresponding to a different visual appearance of the computer-generated object;
      select, at the look-selector node, an active look from the plurality of looks;
      pass the active look to a next node of the dependency graph; and
      compute the rendered image of the computer-generated object having a visual appearance that corresponds to the active look.

18. The apparatus of claim 17, wherein the computer processor is further configured to:
   assign a visual effect to the asset at an upstream node that precedes the look-selector node in the dependency graph, wherein the visual effect is assigned to each look of the plurality of looks of the asset.

19. The apparatus of claim 17, wherein the computer processor is further configured to:
   assign a visual effect to the asset at a downstream node that follows the look-selector node in the dependency graph, wherein the visual effect is assigned only to the active look of the plurality of looks of the asset.

20. The apparatus of claim 17, wherein the next node is a render node and the render node is used to compute the rendered image of the computer-generated scene.

* * * * *